(12) United States Patent
Sun

(10) Patent No.: US 11,216,648 B2
(45) Date of Patent: Jan. 4, 2022

(54) METHOD AND DEVICE FOR FACIAL IMAGE RECOGNITION

(71) Applicant: VIA TECHNOLOGIES, INC., New Taipei (TW)

(72) Inventor: Hao Sun, Shanghai (CN)

(73) Assignee: VIA TECHNOLOGIES, INC., New Taipei (TW)

(*) Notice: Subject to any disclaimer, the term of this patent is extended or adjusted under 35 U.S.C. 154(b) by 91 days.

(21) Appl. No.: 16/807,292

(22) Filed: Mar. 3, 2020

(65) Prior Publication Data

US 2021/0081653 A1   Mar. 18, 2021

(30) Foreign Application Priority Data

Sep. 18, 2019 (CN) .......................... 201910881025.X

(51) Int. Cl.
*G06K 9/00* (2006.01)
*G06K 9/62* (2006.01)
*G06N 3/08* (2006.01)

(52) U.S. Cl.
CPC ..... *G06K 9/00288* (2013.01); *G06K 9/00261* (2013.01); *G06K 9/6256* (2013.01); *G06K 9/6265* (2013.01); *G06N 3/08* (2013.01)

(58) Field of Classification Search
CPC ............ G06K 9/00335; G06K 9/6232; G06K 9/00295; G06K 9/00288; G06K 9/00234; G06K 9/00362; G06K 9/00268; G06T 13/40; G06T 2207/30196; G06T 7/0012
See application file for complete search history.

(56) References Cited

U.S. PATENT DOCUMENTS

| | | | |
|---|---|---|---|
| 7,027,054 B1* | 4/2006 | Cheiky | G06T 13/40 345/473 |
| 7,110,575 B2* | 9/2006 | Chen | G06K 9/00228 382/118 |
| 7,421,097 B2* | 9/2008 | Hamza | G06K 9/00288 235/382 |
| 7,508,961 B2* | 3/2009 | Chen | G06K 9/00234 382/118 |

(Continued)

FOREIGN PATENT DOCUMENTS

| | | |
|---|---|---|
| CN | 109145801 A | 1/2019 |
| TW | 201023056 A1 | 6/2010 |

*Primary Examiner* — Yosef Kassa
(74) *Attorney, Agent, or Firm* — McClure, Qualey & Rodack, LLP

(57) ABSTRACT

A method for facial image recognition is provided. A plurality of original facial images are received. A plurality of standard facial images corresponding to the original facial images are generated through a standard face generation model. A recognition model is trained by using the original facial images and the standard facial images. The recognition model is tested by using the original facial image test set and a standard facial image test set until the recognition model recognizes that the first accuracy rate of the original facial image test set is higher than a first threshold value and the second accuracy rate of the standard facial image test set is higher than a second threshold value. The original facial image test set is composed of the original facial images obtained by sampling, and the standard facial image test set is composed of the standard facial images obtained by sampling.

40 Claims, 12 Drawing Sheets

(56) References Cited

U.S. PATENT DOCUMENTS

| | | | | |
|---|---|---|---|---|
| 7,512,571 B2 * | 3/2009 | Rudolf | ............... | G06N 3/063 |
| | | | | 706/14 |
| 7,657,086 B2 * | 2/2010 | Gu | ............... | G06K 9/00281 |
| | | | | 382/159 |
| 7,912,246 B1 * | 3/2011 | Moon | ............... | G06K 9/00221 |
| | | | | 382/103 |
| 8,121,356 B2 * | 2/2012 | Friedman | ............... | G06K 9/00255 |
| | | | | 382/115 |
| 8,213,689 B2 * | 7/2012 | Yagnik | ............... | G06K 9/6255 |
| | | | | 382/118 |
| 8,300,900 B2 | 10/2012 | Lai et al. | | |
| 8,488,023 B2 * | 7/2013 | Bacivarov | ............... | G06T 7/40 |
| | | | | 348/239 |
| 9,965,901 B2 * | 5/2018 | Zhang | ............... | G06T 19/20 |
| 2018/0343120 A1 | 11/2018 | Andrade | | |
| 2019/0158309 A1 | 5/2019 | Park et al. | | |

\* cited by examiner

EIG. 2E

METHOD AND DEVICE FOR FACIAL IMAGE RECOGNITION

CROSS REFERENCE TO RELATED APPLICATIONS

This Application claims priority of China Patent Application No. 201910881025.X, filed on Sep. 18, 2019, the entirety of which is incorporated by reference herein.

BACKGROUND OF THE INVENTION

Field of the Invention

The present disclosure relates generally to biometrics, and more particularly to a method and apparatus for facial recognition.

Description of the Related Art

Since the face is an important biological feature of human beings, much research related to the face has been conducted. One of the important applications of this research is in facial recognition, which uses computer analysis to compare facial features for recognition. When face recognition is used as the basis for access control, the management and installation costs of a proximity card can be omitted, and the trouble of a person who forgets their card when entering or leaving the gate can be avoided. Compared with other biometric recognition methods, face recognition is performed in a non-invasive and non-contact manner, which is easy for most people to accept. In particular, when you don't have time to swipe your card or press the password with your hand, this is one of the advantages of face recognition technology.

In addition, another important research related to the face is face detection. Face detection is usually used when a suspicious moving object enters the setting of a surveillance camera, and immediately detects and activates facial recognition and tracking to lock in on the moving object and determine whether it is a suspicious intruder.

However, due to modern people's constant pursuit of trends, they often wear hats, glasses, sunglasses, masks, makeup, etc. At the same time, when performing face recognition, the recognition angle may be different due to the difference in an individual's height and body shape, for example. This will cause recognition angle problems, such as lowering of sides and head. How to quickly and accurately recognize the results of faces in different states is an urgent issue.

Therefore, there is a need for a method and device for face recognition to improve the accuracy of face recognition.

BRIEF SUMMARY OF THE INVENTION

A method and device for facial image recognition are provided. An embodiment of a method for facial image recognition is provided. A plurality of original facial images are received. A plurality of standard facial images corresponding to the original facial images are generated through a standard face generation model. A recognition model is trained by using the original facial images and the standard facial images. The recognition model is tested by using the original facial image test set and a standard facial image test set until the recognition model recognizes that the first accuracy rate of the original facial image test set is higher than a first threshold value and the second accuracy rate of the standard facial image test set is higher than a second threshold value. The original facial image test set is composed of the original facial images by sampling, and the standard facial image test set is composed of the standard facial images by sampling.

Furthermore, an embodiment of a face recognition device is provided. The face recognition device includes one or more processors and one or more computer storage media for storing computer readable instructions. The processor uses the computer storage media to receive a plurality of original facial images; generate a plurality of standard facial images that correspond to the original facial images through a standard face generation model; train a recognition model by using the original facial images and the standard facial images; and test the recognition model by using the original facial image test set and a standard facial image test set until the recognition model recognizes that the first accuracy rate of the original facial image test set is higher than a first threshold value and the second accuracy rate of the standard facial image test set is higher than a second threshold value. The original facial image test set is composed of the original facial images obtained by sampling, and the standard facial image test set is composed of the standard facial images obtained by sampling.

Moreover, an embodiment of a method for facial image recognition is provided. A first standard facial image corresponding to a first original facial image of a user is generated through a standard face generating model. A second standard facial image corresponding to a second original face image of the user is generated through the standard face generation model. The second original facial image is compared with the first original facial image to obtain a first similarity, and comparing the second standard facial image with the first standard facial image to obtain a second similarity. A final similarity is calculated according to the first similarity and the second similarity.

Furthermore, an embodiment of a face recognition device is provided. The face recognition device includes one or more processors and one or more computer storage media for storing computer readable instructions. The processor uses the computer storage media to generate a first standard facial image that corresponds to the first original facial image of the user through a standard face generating model; generate a second standard facial image that corresponds to the second original face image of the user through the standard face generation model; compare the second original facial image with the first original facial image to obtain a first similarity, and compare the second standard facial image with the first standard facial image to obtain a second similarity; and calculate the final similarity according to the first similarity and the second similarity.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIGS. 2A through 2L show the original facial images according to an embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration". Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

Figure 1:
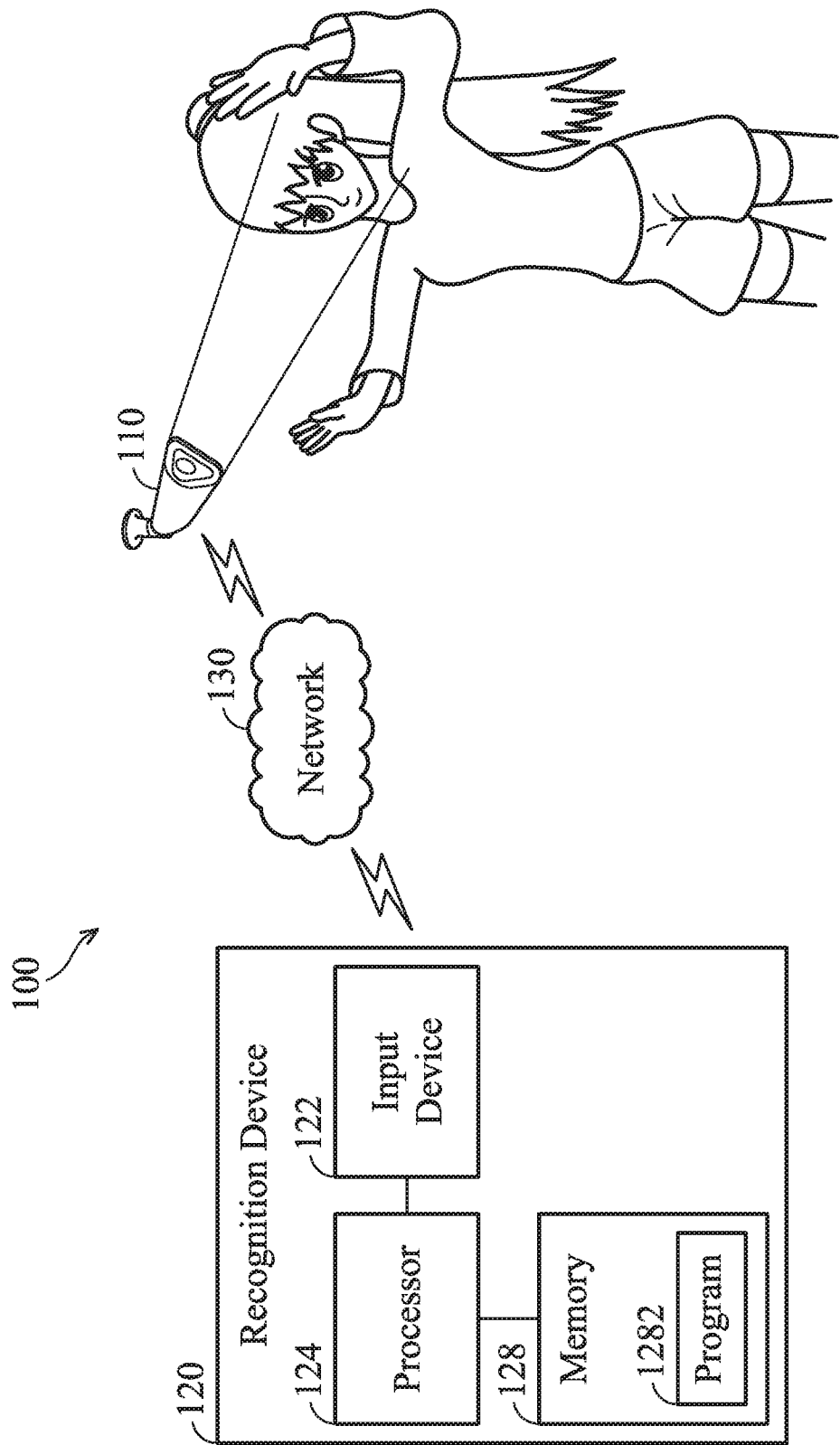
FIG. 1 shows a schematic diagram illustrating a face recognition system according to an embodiment of the invention.

FIG. 1 shows a schematic diagram illustrating a face recognition system 100 according to an embodiment of the invention. The face recognition system 100 includes at least an image capture device 110 and a recognition device 120 connected to a network 130.

The set angle of the image capturing device 110 is mainly an angle capable of catching a human face to capture a facial image. The image capture device 110 may be any commercially available device or apparatus that can capture images, such as a webcam.

The recognition device 120 may include an input device 122, and the input device 122 is configured to receive input data from various sources. For example, the recognition device 120 may receive the facial image data from other source devices or receive the facial image transmitted by the image capture device 110 through the network 130. The recognition device 120 may also receive the training images including faces, and may further be trained as a recognizer configured to recognize a face according to the received training images.

The recognition device 120 further includes a processor 124 and a memory 128. In addition, the images may be stored in the memory 128. In one embodiment, the recognition device 120 may be used with components, systems, sub-systems, and/or devices other than those that are depicted herein.

The types of recognition device 120 range from small handheld devices, such as mobile telephones and handheld computers to large mainframe systems, such as mainframe computers. Examples of handheld computers include personal digital assistants (PDAs) and notebooks. The image capture device 110 is connected to the recognition device 120 through the network 130. The network 130 may be any type of network familiar to those skilled in the art that can support data communication by using any one of the communication-available protocols, including but not limited to TCP/IP and so on. For example, the network 130 can be a local area network (LAN), such as an Ethernet network, etc., a virtual network, including but not limited to a virtual private network (VPN), the Internet, a wireless network, and/or any combination of these and/or other networks.

Figure 7:
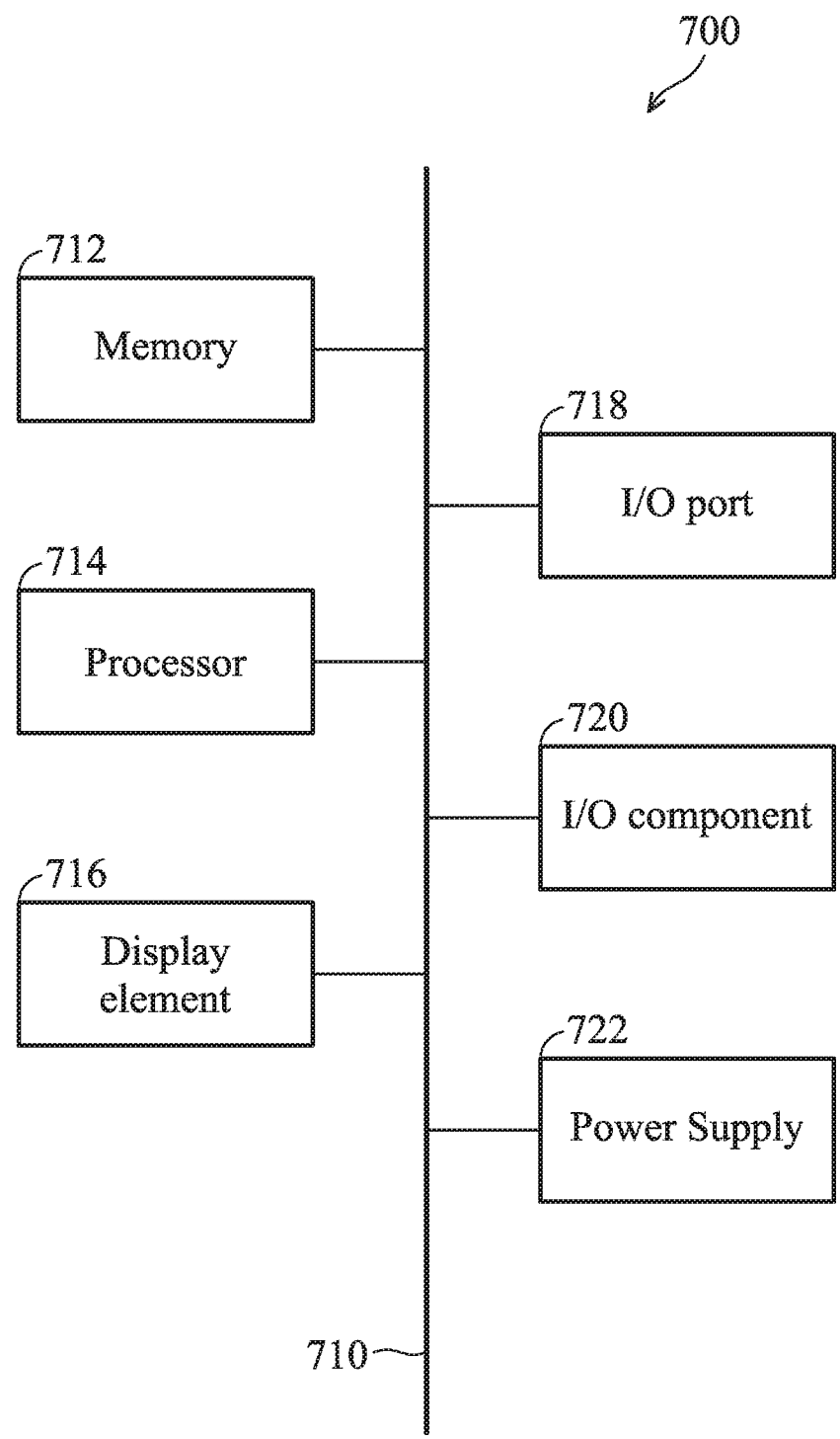
FIG. 7 shows an exemplary operating environment for implementing embodiments of the invention.

It should be understood that the recognition device 120 shown in FIG. 1 is example architecture of the face recognition system 100. Each of the elements shown in FIG. 1 can be implemented by any type of computing device, such as computing device 700 described with reference to FIG. 7, as shown in FIG. 7.

Figure 2A:
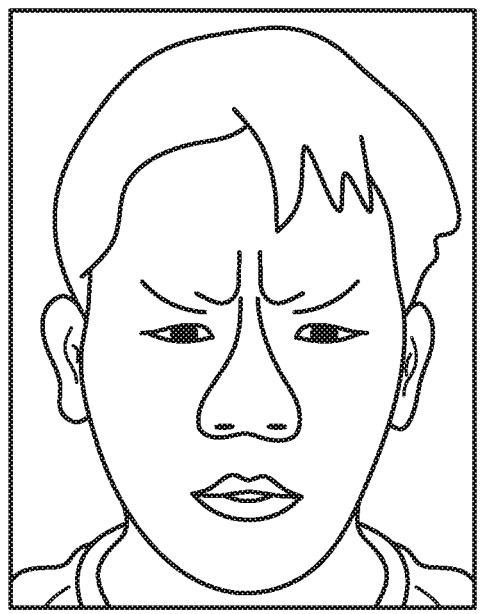
Figure 2B:
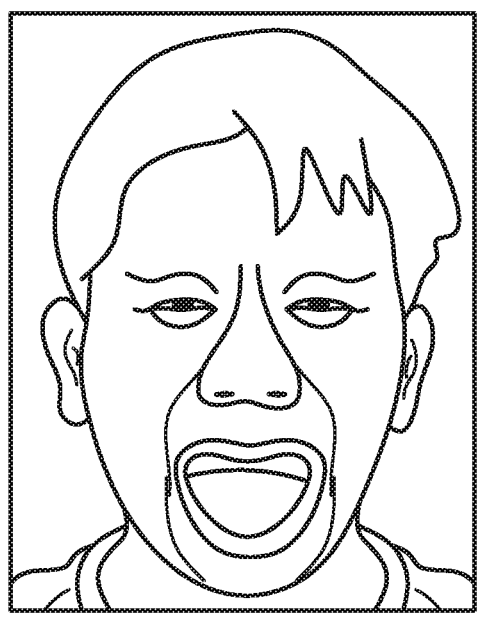
Figure 2C:
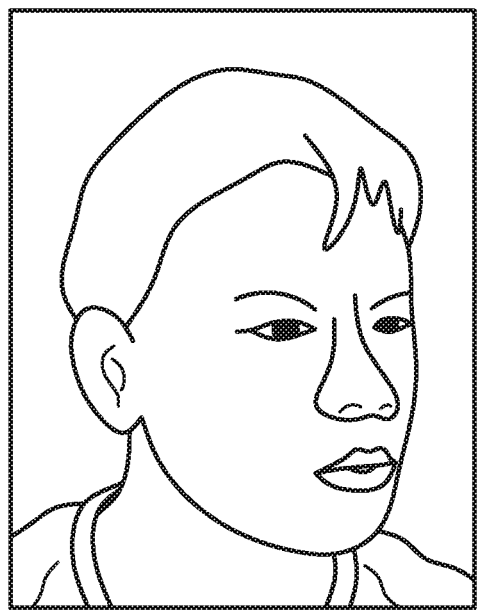
Figure 2D:
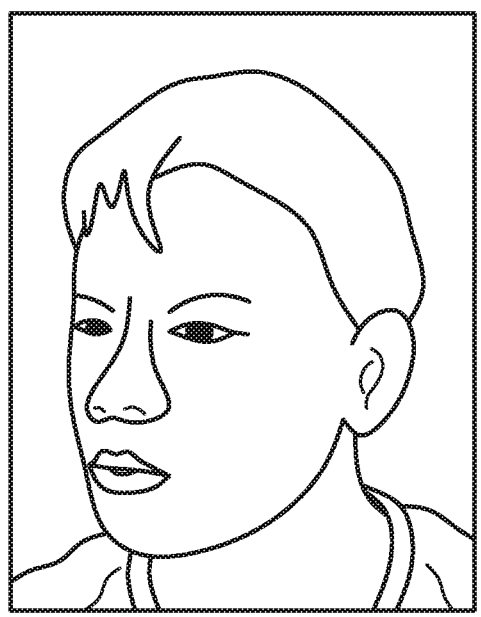
Figure 2F:
Figure 2F:
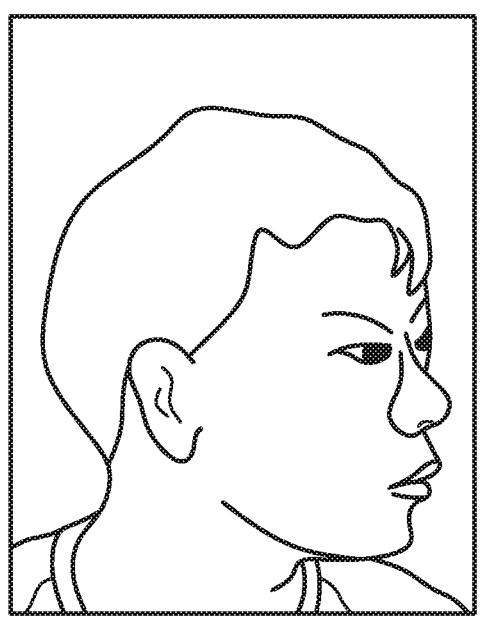
Figure 2G:
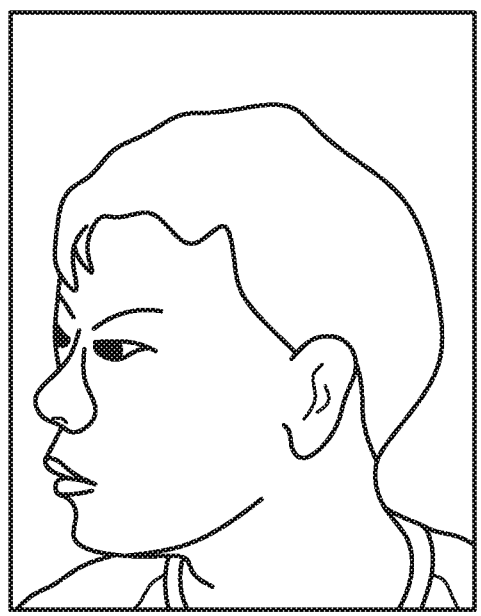
Figure 2H:
Figure 2I:
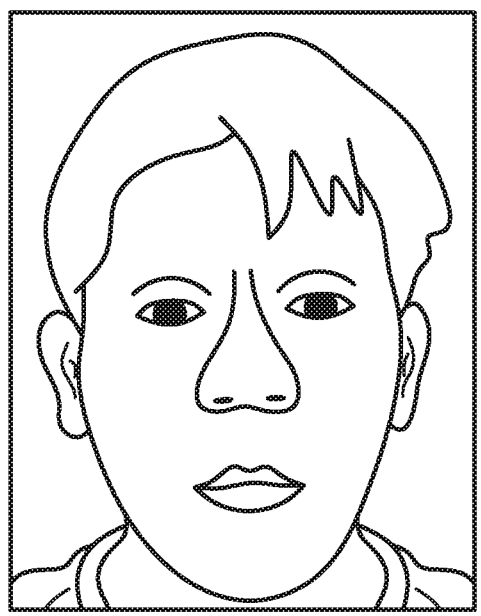
Figure 2J:
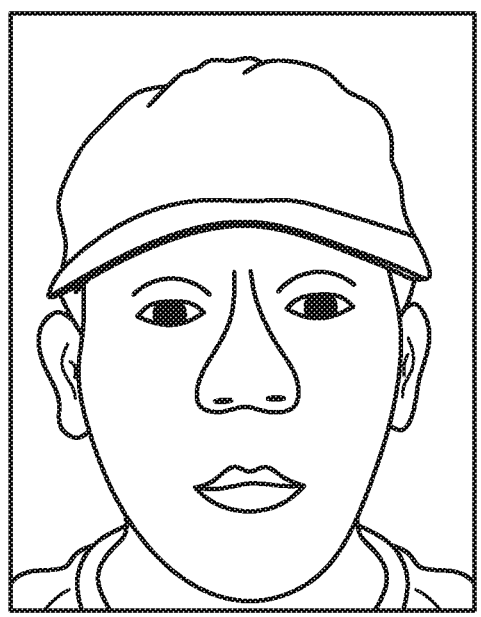

In order to facilitate the description of the embodiments of the invention, an original facial image and a standard facial image are defined first. The original facial image is defined as the originally obtained facial image. For example, the original facial image may be a facial image configured with wearing ornaments (such as masks, glasses, hats, etc.), a facial image with hair, a facial image with makeup, a facial image with expressions (e.g., exaggerated expression), a facial image where the non-critical part of the face is blocked or a facial image showing only the side. FIGS. 2A through 2L show the original facial images according to an embodiment of the invention. FIGS. 2A and 2B show that the original facial images are the facial images having multiple expressions (e.g., frown, open mouth and other expressions). FIGS. 2C through 2H show that the original facial images are the facial images showing only a side face or the facial images in which a face is deviated in a specific direction. FIGS. 2I through 2L show that the original facial images are the facial images configured with wearing ornaments (for example, a mask, glasses, hat, etc.).

Figure 3:
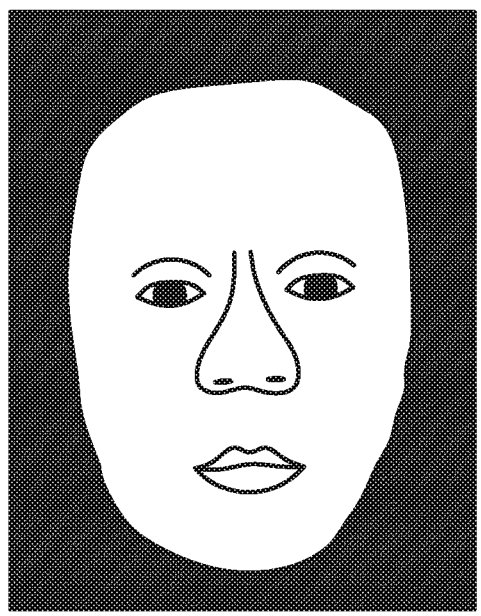
FIG. 3 shows a standard facial image according to an embodiment of the invention.

A standard facial image is defined as a frontal image including only a face area. For example, a standard facial image is a frontal face image with no makeup on the face area, no hair, and no decorations (such as a mask, glasses, hat, etc.). FIG. 3 shows a standard facial image according to an embodiment of the invention. As shown in FIG. 3, the standard facial image has only the face area, and no other decorative objects (such as masks, glasses, hats, etc.).

Figure 4:
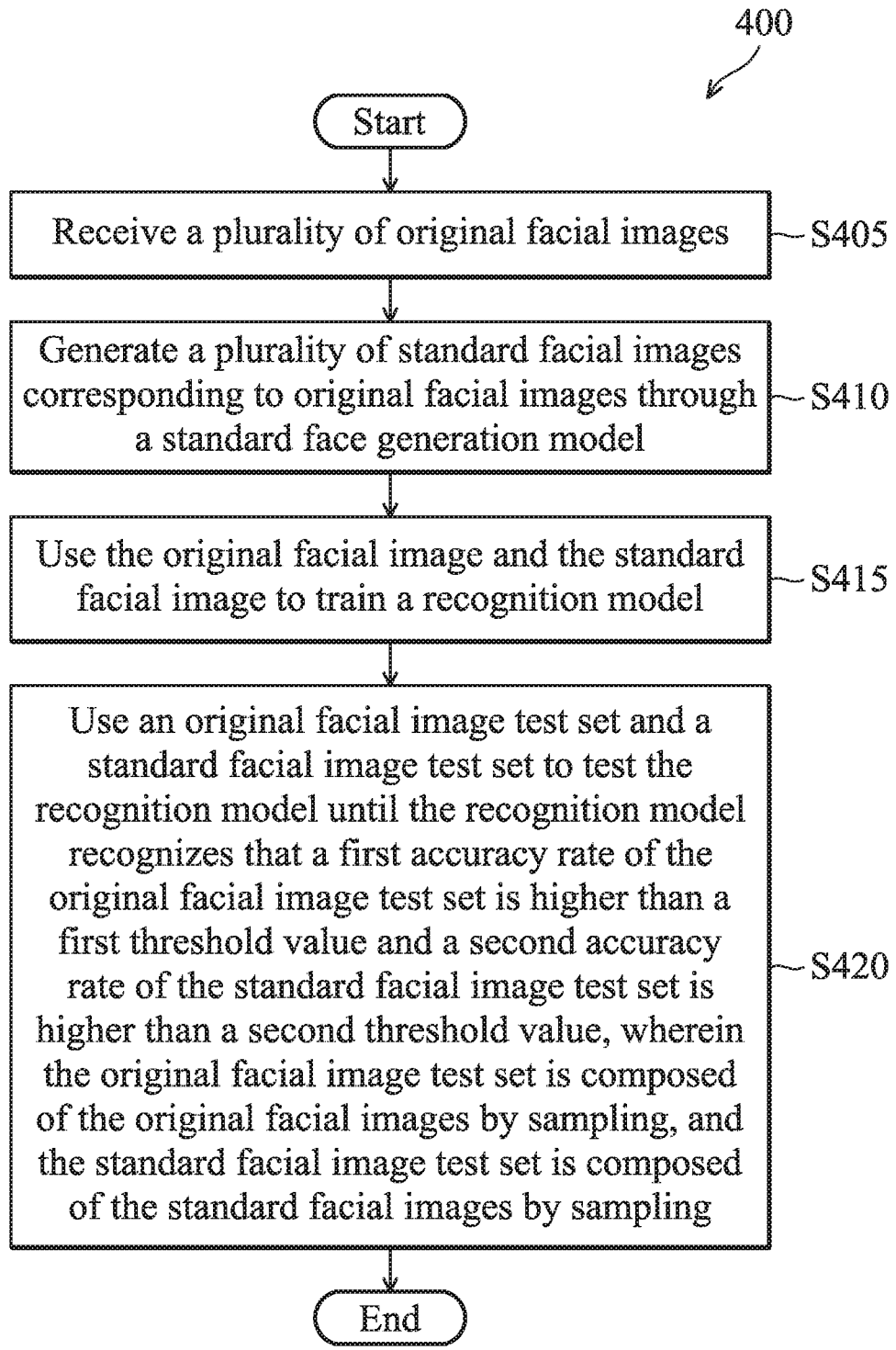
FIG. 4 is a flow chart illustrating a method 400 of facial image recognition according to an embodiment of the invention.

FIG. 4 is a flow chart illustrating a method 400 of facial image recognition according to an embodiment of the invention. This method 400 can be implemented in the processor 124 of the recognition device 120 as shown in FIG. 1.

In step S405, the recognition device receives a plurality of original facial images. In one embodiment, the recognition device may receive the original facial images from other source devices or receive the original facial images transmitted by the image capture device through the network. The collections of original facial images can also be referred to herein as the original facial image test set.

Figure 2K:
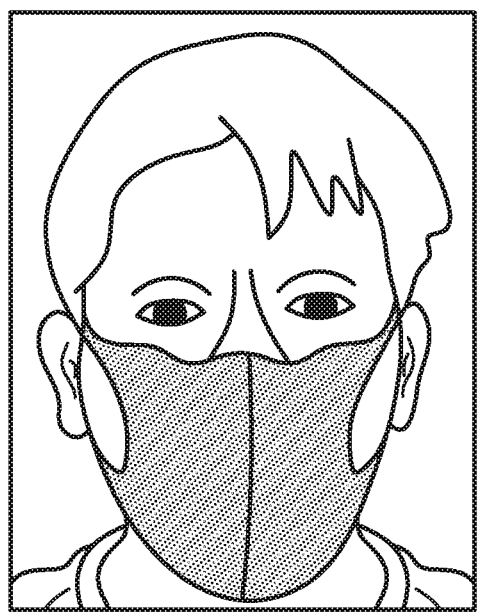
Figure 2L:
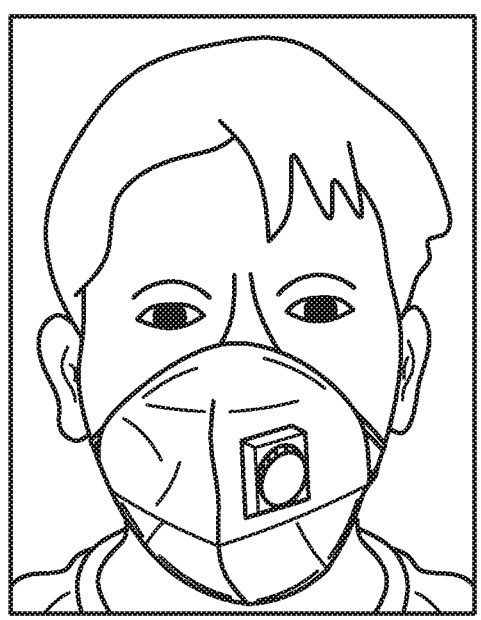
Figure 5:
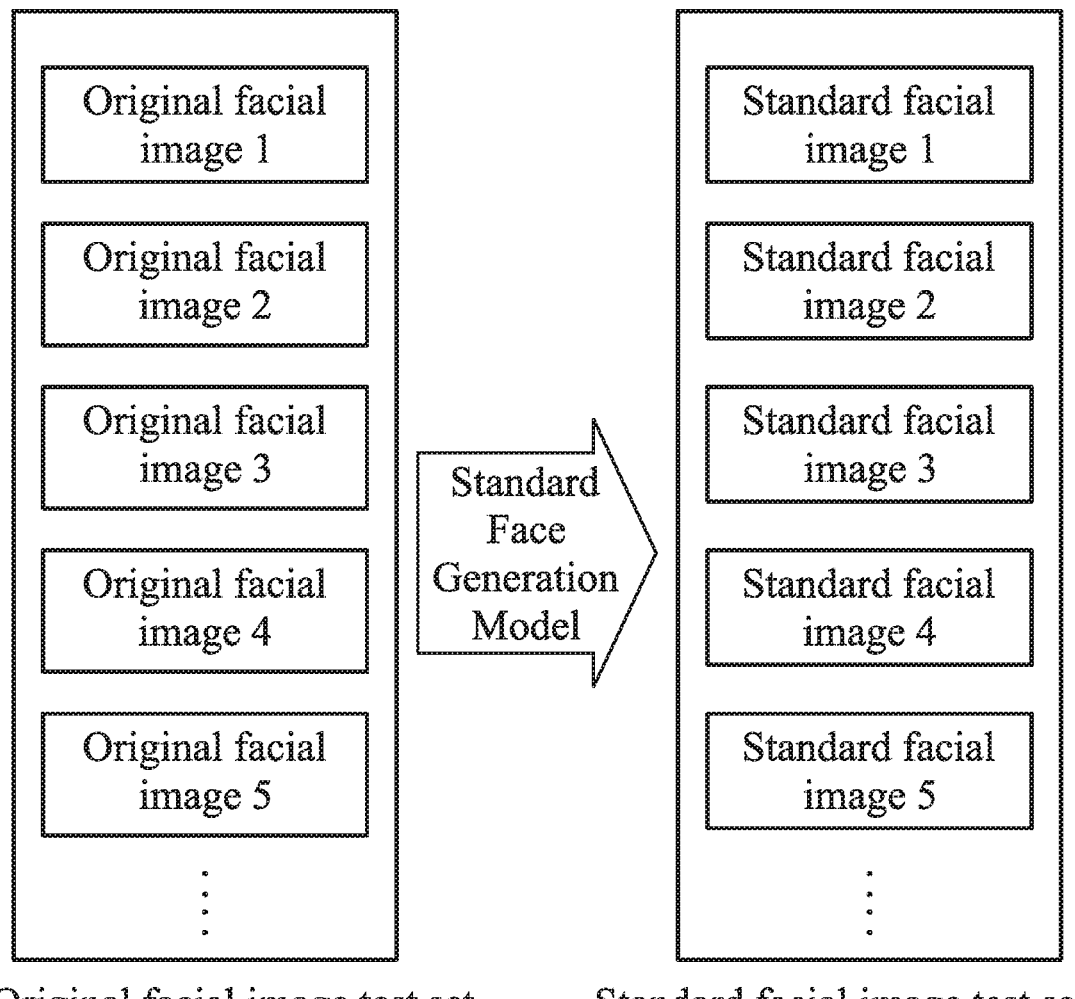
FIG. 5 shows a correspondence relationship between the original facial image in the original facial image test set and the facial image in the standard facial image test set according to an embodiment of the invention.

Next, in step S410, the recognition device generates a plurality of standard facial images corresponding to the original facial images through a standard face generation model. For example, when the original facial image is covered by a mask (such as mouth, nose) or is a side face, the standard face generation model may simulate and generate the covered part. For example, when the original facial image is a side face (as shown in FIGS. 2C, 2D, 2E, 2F, 2G and 2H) or the mouth and nose are covered by a mask (as shown in FIGS. 2K and 2L), a part of the facial information is missing, and the covered parts are generated by simulation with the standard face generation model. In one embodiment, the standard face generation model is a generative adversarial network (GAN). The GAN refers to a method for generating a standard face by using the generative adversarial network. Specifically, GAN further includes the corresponding derivative technologies and methods, such as inforGAN, BigGAN, cycleGAN, AttGAN, StarGAN and so on. In another embodiment, the standard face generation model is a variational auto-encoder (VAE). It should be noted that the standard face generation model can be implemented by the processor 124 in the recognition device 120 of FIG. 1. In addition, a set of the plurality of standard facial images can also be referred to herein as a standard facial image test set, wherein the facial images in the original facial image test set and the facial images in the standard facial image test set correspond one-to-one, and the corresponding relationship is shown in FIG. 5. It should be noted that the facial images in the original facial image test set and the facial images in the standard facial image test set can be randomly collected test images or the facial images of the actual users. In the face recognition process, when the facial images used by the recognition model during the training phase is the randomly test images, the user's original facial image and the corresponding standard facial image can be re-entered into the database of the recognition model. When the facial images used by the recognition model in the training process is the facial image of the actual user, the user's original facial image and the standard facial image are directly imported into the database of the recognition model. It is more important to note that when re-entering the user's original facial image and the corresponding standard facial image or importing the actual user's original facial image and the standard facial image into the database of the recognition device, the recognition model can be used without retraining.

In step S415, the recognition device uses the original facial image and the standard facial image to train a recognition model. In one embodiment, the recognition model is a convolutional neural network (CNN). In step S420, the recognition device tests the recognition model by using the original facial image test set and the standard facial image test set until the recognition model recognizes the first accuracy rate of the original facial image test set is greater than a first threshold value and the second accuracy rate of the standard facial image test set is greater than a second threshold value, wherein the original facial image test set is composed of the original facial images obtained by sampling and the standard facial image test set is composed of the standard facial images obtained by sampling. It should be noted that the first threshold value and the second threshold value can be set artificially according to the actual use conditions and requirements of product applications. For example, under normal circumstances, the first threshold value and the second threshold value may be set to 50%, that is, when the recognition model is accurately expanded by more than half, the recognition model may be considered to have sufficient recognition ability. However, under stricter application requirements such access control identification and immigration identification, the first threshold value and the second threshold value may be set to a proportional value (for example, 99%), that is, when the accuracy rate of the recognition model exceeds the threshold value, the recognition model has recognizable ability.

In another embodiment, after performing step S420, the recognition device may further test the recognition model by using a hybrid test set, wherein the hybrid test set is composed of random samples of the original facial images in the original facial image test set and the standard facial images in the standard facial image test set. For example, the hybrid test set consists of a random sample of the original facial images and the standard facial images at different ratios (e.g., 1:1, 2:1, or 1:2), or the hybrid test set consists of the original facial images and the standard facial images that are composed of random samples without limiting the proportion or number according to the actual test conditions. When the recognition model recognizes that a third accuracy rate of the hybrid test set is higher than a third threshold value, the recognition device may determine that the recognition model has the ability to recognize both the original face and the standard face. In the embodiment, it should be particularly noted that, in some practical applications, step S420 does not need to be performed, and a hybrid test set is used to test the recognition model. More specifically, the recognition model is tested separately by using a hybrid test set, so that the recognition model has the ability to recognize both the original face and the standard face at the same time without step S420 for training the recognition model.

Figure 6:
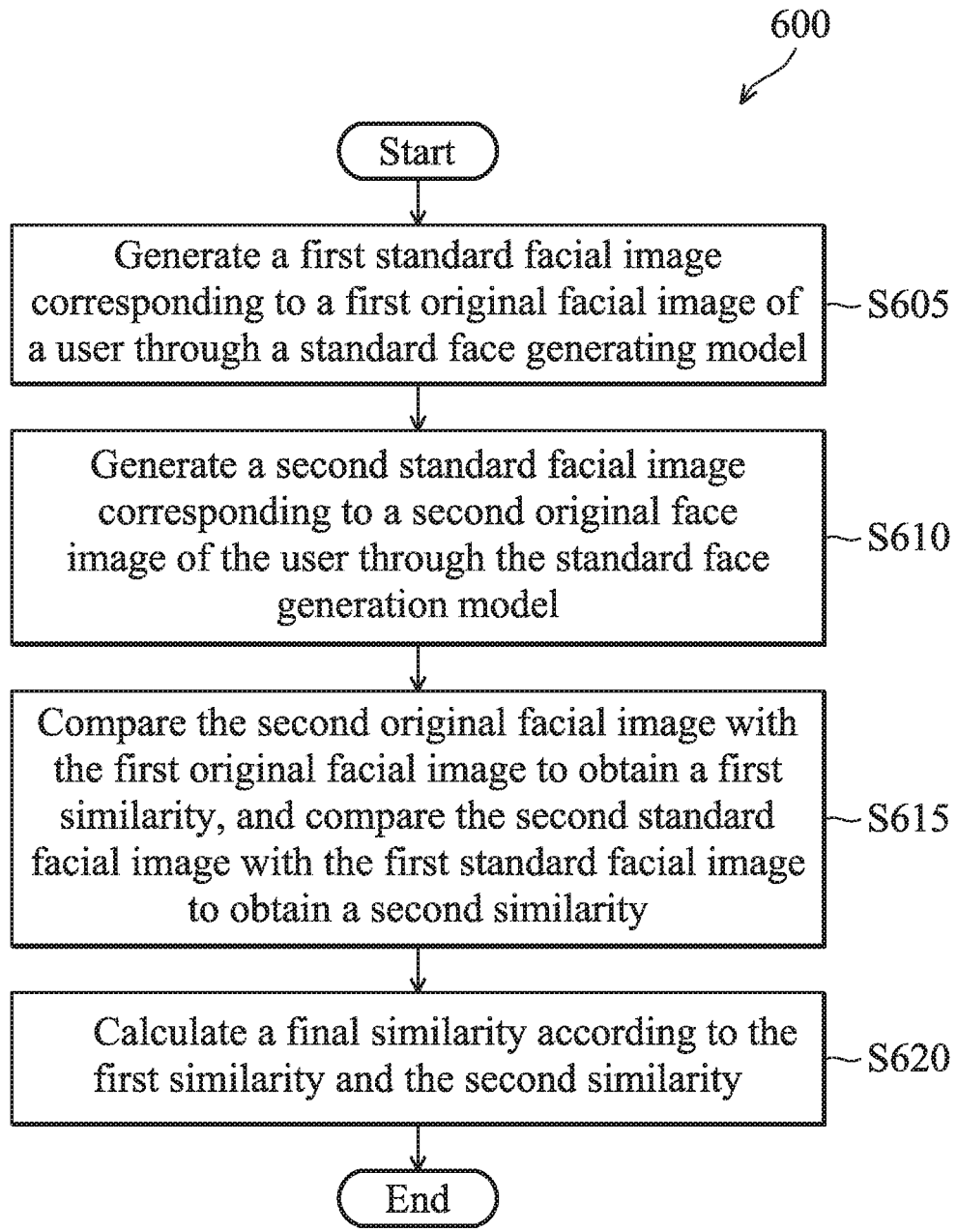
FIG. 6 shows a flowchart illustrating a method 600 for face recognition according to an embodiment of the invention.

The process of how the recognition device trains and tests the recognition model to perform face recognition is described in detail below. FIG. 6 shows a flowchart illustrating a method 600 for face recognition according to an embodiment of the invention. The method 600 may be executed in the processor 124 of the recognition device 120 in FIG. 1.

Before the flow begins, the recognition device has previously trained and tested the recognition model. In addition, the recognition device may store a first original facial image corresponding to one user at first. In step S605, the recognition device generates a first standard facial image corresponding to the first original facial image of the user through the standard face generation model. In one embodiment, the standard face generation model is a generative adversarial network. In another embodiment, the standard face generation model is a variant auto-encoder. It should be noted that the standard face generation model can be implemented by the processor 124 of the recognition device 120 in FIG. 1. In some practical applications, the first original facial image and the first standard facial image are directly imported from the original facial image test set and the standard facial image test set that is generated when the face recognition model is trained, to the database of the recognition device. In other practical applications, the first original facial image and the first standard facial image are re-entered into the database of the recognition device according to various applications. It should be noted that the first original facial image and the first standard facial image are stored in advance as a user's facial image in the database of the recognition device. In other words, the first original facial image and the first standard facial image are pre-stored images.

Next, in step S610, the recognition device generates a second standard facial image corresponding to a second original facial image of the user through the standard face generation model. The second original facial image may be received by the recognition device from other source devices through the network, or may be transmitted by the image capture device, and the second standard facial image may be generated in real time through the standard face generation model. In other words, the second original facial image and the second standard facial image are instant images. It should be noted that the first original facial image or the second original facial image may be a facial image having multiple expressions (e.g., exaggerated expression) or other objects (e.g., masks, glasses, hats, etc.). In another embodiment, the recognition device may also receive an image including the corresponding user. For example, the image may include more than two different faces, and one of the different faces is the second original facial image. It should be noted that the first standard facial image and the second standard facial image are each a frontal facial image including only one face area and no other objects in the face area.

Next, in step S615, the recognition device compares the second original facial image with the first original facial image to obtain a first similarity, and compares the second standard facial image with the first original facial image to obtain a second similarity.

In step S620, the recognition device calculates a final similarity according to the first similarity and the second similarity, and the final similarity FinalSimilarity is expressed as follows:

FinalSimilarity=α×Simi$P2P1$+β×Simi$F2F1$, where Simi$P2P1$ is the first similarity, Simi$F2F1$ is the second similarity, α and β are values between 0 and 1, α+β=1 and α≥β. In one embodiment, α=0.5 and β=0.5. The purpose of α≥β will be explained in detail below. In most cases, the recognition rate of the original facial image is higher than that of the standard facial image. However, if some facial features are hidden, the recognition rate of the standard facial image is higher than that of the original facial image. Therefore, after performing face recognition by combining the original facial image and the standard facial image, the recognition device gives a higher weight α to the recognition rate of the original facial image and a weight β to the recognition rate of the standard facial image, so as to improve the success rate of face recognition.

In another embodiment, after performing step S620, the recognition device may further compare the second original facial image with the first standard facial image to obtain a third similarity, and compare the second standard facial image with the first original facial image to obtain a fourth similarity. The recognition device may calculate the final similarity based on the first similarity, the second similarity, the third similarity, and the fourth similarity, and the final similarity FinalSimilarity is expressed as follows:

FinalSimilarity=α×Simi$P2P1$+β×Simi$F2F1$+γ×Simi$P2P1$+δ×Simi$F2F1$, where Simi$P2P1$ is the first similarity, Simi$F2F1$ is the second similarity, Simi$P2F1$ is the third similarity, and Simi$F2P1$ is the fourth similarity, α, β, γ and δ are values between 0 and 1, and α+β+γ+δ=1, α≥β+γ+δ, and β>γ+δ. In one embodiment, α=0.5, β=0.3, γ=0.1, and δ=0.1. In the following, the meanings of α≥β+γ+δ, and β>γ+δ will be described in more detail. In most cases, the recognition rate of the original facial image is higher than that of the standard facial image. However, if some facial features are hidden, the recognition rate of the standard facial image is higher than that of the original facial image. Therefore, after performing face recognition by combining the original facial image and the standard facial image, the recognition device gives a higher weight α to the recognition rate of the original facial image. In addition to paying more attention to the recognition rate of the original facial image and assigning a higher weight α, the recognition rate of the standard facial image is still used as a reference. However, the recognition rate of the standard facial image is still higher than that using the cross comparison between the original facial image and the standard facial image. Therefore, the recognition device sets the weight β of the standard facial image to greater than the weight sum γ+δ of the cross comparison between the original facial image and the standard facial image. It should be noted that the values α, β, γ and δ are not meant to limit the present disclosure, and a person of ordinary skill in the technical field to which they belong may make appropriate substitutions or adjustments according to this embodiment.

As described above, the methods and devices for face recognition of the disclosure uses a standard face generation model to remove the decoration of the original facial image, so as to help facial recognition and improve accuracy.

For the embodiments of the invention that have been described, an exemplary operating environment in which embodiments of the invention may be implemented is described below. With specific reference to FIG. 7, FIG. 7 shows an exemplary operating environment for implementing embodiments of the invention, and can generally be considered a computing device 700. The computing device 700 is only one example of a suitable computing environment, and is not intended any limitation on the scope of use or function of the invention. Nor should computing device 700 be interpreted as having any dependency or requirement relating to any or combination of the elements shown.

The invention can be implemented in computer code or machine usable instructions, which can be computer executable instructions of a program module, the program modules being executed by a computer or other machine, such as a personal digital assistant or other portable device. Generally, a program module includes routines, programs, objects, components, data structures and so on, and the program module refers to a code that performs a specific task or implements a specific abstract data type. The invention can be implemented in a variety of system configurations, including portable devices, consumer electronics, general purpose computers, more specialized computing devices, and the like. The invention can also be implemented in a distributed computing environment to process devices coupled by a communication network.

Refer to FIG. 7. The computing device 700 includes a bus 710, a memory 712, one or more processors 714, one or more display elements 716, input/output (I/O) ports 718, input/output (I/O) components 720 and an illustrative power supply 722. The bus 710 represents an element (e.g., an address bus, a data bus, or a combination thereof) that can be one or more bus bars. Although the blocks of FIG. 7 are shown in a line for the sake of brevity, in practice, the boundaries of the various elements are not specific, for example, the presentation elements of the display device may be considered as I/O elements, and the processor may have memory.

Computing device 700 generally includes a variety of computer readable media. The computer readable medium can be any available media that can be accessed by computing device 700, including both volatile and non-volatile media, removable and non-removable media. By way of example and not limitation, the computer readable media may include computer storage media and communication media. The computer readable media is also included in any method or technique for storing information such as computer readable instructions, data structures, program modules or other data for volatile and non-volatile media, removable and non-removable media. The computer storage media includes, but is not limited to, RAM, ROM, EEPROM, flash memory or other memory technology, CD-ROM, digital versatile disc (DVD) or other optical disc storage device, magnetic disk, disk, disk storage device or other magnetic storage device, or any other medium that can be used to store the required information and that can be accessed by the computing device 700. The computer storage media itself does not include signals.

The communication media typically includes computer readable instructions, data structures, program modules or other data in the form of modular data signals such as carrier waves or other transmission mechanisms, and includes any information delivery media. The term "modular data signal" refers to a signal that has one or more feature sets or is modified in such a way as to encode information in the signal. By way of example and not limitation, the communication media includes both wired and direct-wired wired and wireless media, such as audio, radio, infrared, and other wireless media. The combination of the above media is included in the scope of computer readable media.

The memory 712 includes computer storage media in the form of volatile and non-volatile memory. The memory can be removable, non-moving or can be a combination of the two. Exemplary hardware devices include solid state memory, hard disk drives, optical disk drives, and the like. The computing device 700 includes one or more processors that read data from entities such as the memory 712 or the I/O component 720. The display component 716 displays a data indication to a user or other device. Exemplary display elements include display devices, speakers, printing elements, vibrating elements, and the like.

The I/O port 718 allows the computing device 700 to be logically coupled to other devices including I/O component 720, some of which are built-in devices. Exemplary components include a microphone, a joystick, a game table, a satellite signal receiver, a scanner, a printer, wireless devices, etc. the I/O component 720 can provide a natural user interface for handling user generated gestures, sounds, or other physiological inputs. In some examples, these inputs can be passed to a suitable network element for further processing. The NUI can implement speech recognition, touch and stylus recognition, facial recognition, biometric recognition, gesture recognition on the screen and adjacent screens, aerial gestures, head and eye tracking, and the random combination of touch recognition associated with display by computing device 700. The computing device 700 can be equipped with a depth camera such as a stereo camera system, an infrared camera system, an RGB camera system, and combinations of these systems to detect and recognize gestures. Additionally, the computing device 700 can be equipped with an accelerometer or gyroscope that detects motion. The output of the accelerometer or gyroscope can be provided to the computing device 700 for display to present an immersive augmented reality or virtual reality.

In addition, the processor 714 in the computing device 700 can also execute the programs and instructions in the memory 712 to present the actions and steps described in the above embodiments, or other descriptions in the description.

Any specific sequence or layering of the procedures disclosed herein is by way of example only. Based on design preferences, it must be understood that any specific order or hierarchy of steps in the program may be rearranged within the scope of the disclosure. The accompanying method claims present elements of the various steps in an exemplary order and should not be limited by the specific order or hierarchy shown here.

The use of ordinal numbers such as "first", "second", "third", etc., used to modify elements in the scope of the patent application does not imply any priority, prioritization, prioritization between elements, or method. The order of the steps, and only used as an identifier to distinguish different elements having the same name (with different ordinal numbers).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for facial image recognition, comprising:
receiving a plurality of original facial images;
generating a plurality of standard facial images corresponding to the original facial images through a standard face generation model;
training a recognition model by using the original facial images and the standard facial images; and
testing the recognition model by using an original facial image test set and a standard facial image test set until the recognition model recognizes that a first accuracy rate of the original facial image test set is higher than a first threshold value and a second accuracy rate of the standard facial image test set is higher than a second threshold value, wherein the original facial image test set is composed of the original facial images obtained by sampling, and the standard facial image test set is composed of the standard facial images obtained by sampling,
wherein each of the standard facial images is a frontal facial image having only one face area and no wearing object in the face area,
wherein the original facial images are facial images having wearing objects.

2. The method as claimed in claim 1, further comprising:
using a hybrid test set to test the recognition model, wherein the hybrid test set consists of a random sample of the original facial images and the standard facial images.

3. The method as claimed in claim 1, further comprising:
generating a first standard facial image corresponding to a first original facial image of a user through the standard face generating model;

generating a second standard facial image corresponding to a second original facial image of the user through the standard face generation model;
comparing the second original facial image with the first original facial image to obtain a first similarity, and comparing the second standard facial image with the first standard facial image to obtain a second similarity; and
calculating a final similarity according to the first similarity and the second similarity.

4. The method as claimed in claim 3, wherein the final similarity FinalSimilarity is expressed as follows:

FinalSimilarity=α×Sim$iP2P1$+β×Sim$iF2F1$, wherein SimiP2P1 is the first similarity, SimiF2F1 is the second similarity, α, and β are values between 0 and 1, and α+β=1 and α≥β.

5. The method as claimed in claim 3, further comprising:
comparing the second original facial image with the first standard facial image to obtain a third similarity, and comparing the second standard facial image with the first original facial image to obtain a fourth similarity; and
calculating the final similarity according to the first similarity, the second similarity, the third similarity, and the fourth similarity.

6. The method as claimed in claim 5, wherein the final similarity Final Similarity is expressed as follows:

FinalSimilarity=α×Sim$iP2P1$+β×Sim$iF2F1$+γ×Sim$iP2F1$+δ×Sim$iF2P1$, where SimiP2P1 is the first similarity, SimiF2F1 is the second similarity, SimiP2F1 is the third similarity, and SimiF2P1 is the fourth similarity, wherein α, β, γ and δ are values between 0 and 1, and α+β+γ+δ=1, α≥β+γ+δ, and β>γ+δ.

7. The method as claimed in claim 1, wherein the wearing object comprises mask, glasses or hat.

8. The method as claimed in claim 1, wherein the standard face generation model is a generative adversarial network (GAN).

9. The method as claimed in claim 1, wherein the standard face generation model is a variational auto-encoder (VAE).

10. A face recognition device, comprising:
one or more processors; and
one or more computer storage media, storing computer readable instructions, wherein the processor uses the computer storage media to:
receive a plurality of original facial images;
generate a plurality of standard facial images corresponding to the original facial images through a standard face generation model;
train a recognition model using the original facial images and the standard facial images; and
test the recognition model using an original facial image test set and a standard facial image test set until the recognition model recognizes that a first accuracy rate of the original facial image test set is higher than a first threshold value and a second accuracy rate of the standard facial image test set is higher than a second threshold value, wherein the original facial image test set is composed of the original facial images obtained by sampling, and the standard facial image test set is composed of the standard facial images obtained by sampling,
wherein each of the standard facial images is a frontal facial image having only one face area and no wearing object in the face area,
wherein the original facial images are facial images having wearing objects.

11. The face recognition device as claimed in claim 10, wherein the process further uses the computer storage media to:
use a hybrid test set to test the recognition model, wherein the hybrid test set consists of a random sample of the original facial images and the standard facial images.

12. The face recognition device as claimed in claim 10, wherein the process further uses the computer storage media to:
generate a first standard facial image corresponding to a first original facial image of a user through the standard face generating model;
generate a second standard facial image corresponding to a second original facial image of the user through the standard face generation model;
compare the second original facial image with the first original facial image to obtain a first similarity, and compare the second standard facial image with the first standard facial image to obtain a second similarity; and
calculate a final similarity according to the first similarity and the second similarity.

13. The face recognition device as claimed in claim 12, wherein the final similarity FinalSimilarity is expressed as follows:

FinalSimilarity=α×Sim$iP2P1$+β×Sim$iF2F1$, wherein SimiP2P1 is the first similarity, SimiF2F1 is the second similarity, α, and β are values between 0 and 1, and α+β=1 and α≥β.

14. The face recognition device as claimed in claim 12, wherein the process further uses the computer storage media to:
compare the second original facial image with the first standard facial image to obtain a third similarity, and comparing the second standard facial image with the first original facial image to obtain a fourth similarity; and
calculate the final similarity according to the first similarity, the second similarity, the third similarity, and the fourth similarity.

15. The face recognition device as claimed in claim 14, wherein the final similarity FinalSimilarity is expressed as follows:

FinalSimilarity=α×Sim$iP2P1$+β×Sim$iF2F1$+γ×Sim$iP2F1$+δ×Sim$iF2P1$, where SimiP2P1 is the first similarity, SimiF2F1 is the second similarity, SimiP2F1 is the third similarity, and SimiF2P1 is the fourth similarity, wherein α, β, γ and δ are values between 0 and 1, and α+β+γ+δ=1, α≥β+γ+δ, and β>γ+δ.

16. The face recognition device as claimed in claim 10, wherein the wearing object comprises mask, glasses or hat.

17. The face recognition device as claimed in claim 10, wherein the standard face generation model is a generative adversarial network (GAN).

18. The face recognition device as claimed in claim 10, wherein the standard face generation model is a variational auto-encoder (VAE).

19. A method for facial image recognition, comprising:
generating a first standard facial image corresponding to a first original facial image of a user through a standard face generating model;
generating a second standard facial image corresponding to a second original facial image of the user through the standard face generation model;

comparing the second original facial image with the first original facial image to obtain a first similarity, and comparing the second standard facial image with the first standard facial image to obtain a second similarity; and calculating a final similarity according to the first similarity and the second similarity, wherein each of the first and second standard facial images is a frontal facial image having only one face area and no wearing object in the face area, wherein the first and second original facial images are facial images having wearing objects.

20. The method as claimed in claim 19, wherein the first original facial image and the first standard facial image are pre-stored images.

21. The method as claimed in claim 19, wherein the second original facial image and the second standard facial image are instant images.

22. The method as claimed in claim 19, wherein the final similarity FinalSimilarity is expressed as follows:

FinalSimilarity=α×SimiP2P1+β×SimiF2F1, wherein SimiP2P1 is the first similarity, SimiF2F1 is the second similarity, α, and β are values between 0 and 1, and α+β=1 and α≥β.

23. The method as claimed in claim 22, wherein α=0.5 and β=0.5.

24. The method as claimed in claim 23, wherein α=0.5, β=0.3, γ=0.1, and δ=0.1.

25. The method as claimed in claim 19, further comprising:

comparing the second original facial image with the first standard facial image to obtain a third similarity, and comparing the second standard facial image with the first original facial image to obtain a fourth similarity; and calculating the final similarity according to the first similarity, the second similarity, the third similarity, and the fourth similarity.

26. The method as claimed in claim 25, wherein the final similarity FinalSimilarity is expressed as follows:

FinalSimilarity=α×SimiP2P1+SimiF2F1+γ×SimiP2F1+δ×SimiF2P1 where SimiP2P1 is the first similarity, SimiF2F1 is the second similarity, SimiP2F1 is the third similarity, and SimiF2P1 is the fourth similarity, wherein α, β, γ and δ are values between 0 and 1, and α+β+γ+δ=1, α≥β+γ+δ, and β>γ+δ.

27. The method as claimed in claim 19, wherein the wearing object comprises mask, glasses or hat.

28. The method as claimed in claim 19, wherein the standard face generation model is a generative adversarial network (GAN).

29. The method as claimed in claim 19, wherein the standard face generation model is a variational auto-encoder (VAE).

30. A face recognition device, comprising:
one or more processors; and
one or more computer storage media, storing computer readable instructions, wherein the processor uses the computer storage media to:

generate a first standard facial image corresponding to a first original facial image of a user through a standard face generating model;

generate a second standard facial image corresponding to a second original facial image of the user through the standard face generation model;

compare the second original facial image with the first original facial image to obtain a first similarity, and compare the second standard facial image with the first standard facial image to obtain a second similarity; and calculate a final similarity according to the first similarity and the second similarity, wherein each of the first and second standard facial images is a frontal facial image having only one face area and no wearing object in the face area, wherein the first and second original facial images are facial images having wearing objects.

31. The face recognition device as claimed in claim 30, wherein the first original facial image and the first standard facial image are pre-stored images.

32. The face recognition device as claimed in claim 30, wherein the second original facial image and the second standard facial image are instant images.

33. The face recognition device as claimed in claim 30, wherein the final similarity FinalSimilarity is expressed as follows:

FinalSimilarity=α×SimiP2P1+β×SimiF2F1, wherein SimiP2P1 is the first similarity, SimiF2F1 is the second similarity, α, and β are values between 0 and 1, and α+β=1 and α≥β.

34. The face recognition device as claimed in claim 33, wherein α=0.5 and β=0.5.

35. The face recognition device as claimed in claim 30, wherein the process further uses the computer storage media to:

compare the second original facial image with the first standard facial image to obtain a third similarity, and comparing the second standard facial image with the first original facial image to obtain a fourth similarity; and calculate the final similarity according to the first similarity, the second similarity, the third similarity, and the fourth similarity.

36. The face recognition device as claimed in claim 35, wherein the final similarity FinalSimilarity is expressed as follows:

FinalSimilarity=α×SimiP2P1+β×SimiF2F1+γ×SimiP2F1+δ×SimiF2P1 where SimiP2P1 is the first similarity, SimiF2F1 is the second similarity, SimiP2F1 is the third similarity, and SimiF2P1 is the fourth similarity, wherein α, β, γ and δ are values between 0 and 1, and α+β+γ+δ=1, α≥β+γ+δ, and β>γ+δ.

37. The face recognition device as claimed in claim 36, wherein α=0.5, β=0.3, γ=0.1, and δ=0.1.

38. The face recognition device as claimed in claim 30, wherein the wearing object comprises mask, glasses or hat.

39. The face recognition device as claimed in claim 30, wherein the standard face generation model is a generative adversarial network (GAN).

40. The face recognition device as claimed in claim 30, wherein the standard face generation model is a variational auto-encoder (VAE).

* * * * *